United States Patent [19]

Califano

[11] Patent Number: 5,577,249
[45] Date of Patent: Nov. 19, 1996

[54] METHOD FOR FINDING A REFERENCE TOKEN SEQUENCE IN AN ORIGINAL TOKEN STRING WITHIN A DATABASE OF TOKEN STRINGS USING APPENDED NON-CONTIGUOUS SUBSTRINGS

[75] Inventor: Andrea Califano, New York, N.Y.

[73] Assignee: International Business Machines Corporation, Armonk, N.Y.

[21] Appl. No.: 512,794

[22] Filed: Aug. 8, 1995

Related U.S. Application Data

[63] Continuation of Ser. No. 923,203, Jul. 31, 1992, abandoned.

[51] Int. Cl.$^6$ .............................. G06F 17/30; G06F 7/20
[52] U.S. Cl. ........................... 395/611; 395/800; 395/13; 395/601; 382/209; 364/DIG. 1; 364/282.1; 364/225.4; 364/275.9
[58] Field of Search ..................................... 395/600, 800, 395/13; 382/117, 209; 364/DIG. 1

[56] References Cited

U.S. PATENT DOCUMENTS

| | | | |
|---|---|---|---|
| 4,670,890 | 6/1987 | Titchener | 375/110 |
| 4,675,829 | 6/1987 | Clemenson | 395/65 |
| 4,753,878 | 6/1988 | Silman | 435/35 |
| 4,760,523 | 7/1988 | Yu | 395/800 |
| 4,796,185 | 1/1989 | Yoshimura et al. | 364/419 |
| 4,811,218 | 3/1989 | Hunkapiller et al. | 364/413.01 |
| 4,853,871 | 8/1989 | Pantoliano et al. | 364/496 |
| 4,876,541 | 10/1989 | Storer | 341/51 |
| 4,899,128 | 2/1990 | Shapiro | 340/146.2 |
| 4,908,773 | 3/1990 | Pantoliano et al. | 364/496 |
| 4,922,414 | 5/1990 | Holloway et al. | 395/400 |
| 4,930,071 | 5/1990 | Tou et al. | 395/600 |
| 4,935,877 | 6/1990 | Koza | 395/13 |
| 4,939,666 | 7/1990 | Hardman | 364/496 |
| 5,008,818 | 4/1991 | Bocast | 395/375 |
| 5,051,745 | 9/1991 | Katz | 341/51 |
| 5,276,616 | 1/1994 | Kuga | 364/419.08 |
| 5,276,741 | 1/1994 | Aragon | 382/40 |

OTHER PUBLICATIONS

K. Takahashi et al. "A New String Search Hardware Architecture for VLSI" (FIGS. 1,2) The 13th Annuary International Symposium On Computer Architecture, Jun. 5, 1986, Tokoyo, Japan pp. 20–27.

T. Barsalou et al., "Searching Gene and Protein Sequence Databases", M. D. Computing vol. 8, No. 3, pp. 144–149, 1991.

S. F. Altschul et al., "Basic Local Alignment Search Tool", J. Mol. Biol. (1990) 215, pp. 403–410.

D. J. Lipman et al., "Rapid and Sensitive Protein Similarity Searches", Science, vol. 227, pp. 1435–1441, 22 Mar. 1985.

*Primary Examiner*—Thomas G. Black
*Assistant Examiner*—Jean R. Homere
*Attorney, Agent, or Firm*—Louis J. Percello

[57] ABSTRACT

This method non sequentially compares a reference sequence of tokens to an original sequence of tokens to determine subsequences of tokens which exactly or similarly match. The method has a novel approach for creating a large number of indexes by partitioning strings of tokens into substrings, appending non contiguous substrings together to form tuples, and creating indexes from the tuples. Indexes are created in this manner for both the original and reference strings. Techniques are also provided to approximately or exactly locate the substrings which where used to create the tuples and indexes from the original sequence of tokens. Original and reference indexes are compared and matches are tracked. Higher numbers of matches result in higher scores (votes) in a table and indicate a stronger similarity between the sequences on the the original and reference strings. Using this method, the degree of similarity can also be determined. The Method is useful when comparing a reference sequence of tokens to a large database of original strings of tokens. It has applications in the biological sciences (human genome mapping or analyzing proteins) and in image, speech, and music recognition.

28 Claims, 12 Drawing Sheets

FIG. 8A

TABLE OF SYMBOLS

| | |
|---|---|
| $X$ | Set of original strings defining a database |
| $X_i$ | An original string in the database of original strings |
| $X_{ref}$ | A reference string |
| $\chi^0$ | A sequence of tokens in an original string |
| $X^0_{ref}$ | A sequence of tokens in a reference string |
| $N_\chi$ | Total number of original strings in the database |
| $\mu$ | A substring |
| $\tau$ | Value of a token in a string or substring |
| $\tau_i$ | Value of a token in the "i th" position on a string or substring |
| $n_\tau$ | Number of possible token values |
| $p_i$ | The "i th" position on a string or substring |
| $\mu_{(p,l)}$ | A substring starting at position p of a larger string and having a length of l tokens |
| $K$ | Number of j-tuples in a set obtained by partitioning a larger string |

FIG. 8B

TABLE OF SYMBOLS

| | |
|---|---|
| $M$ | Set of substrings formed by partitioning |
| $\xi$ | An original tuple |
| $\xi_{ref}$ | A reference tuple |
| j-tuple | A tuple formed with j number of substrings, at least two of which are non contiguous |
| $\xi^{(j,L)}$ | A j-tuple of length L and tuple order j |
| $\xi_k^{(j,L)}$ | k th j-tuple of total length L |
| $L_s$ | Length, in tokens, of a given string |
| $\gamma$ | An original index |
| $\gamma_{ref}$ | A reference index |
| $\rho$ | An information record in a look-up structure |
| $\alpha$ | A pointer in an information record |
| $\delta$ | Displacement information about an original tuple |
| $\Delta$ | Displacement information about a reference tuple |

METHOD FOR FINDING A REFERENCE TOKEN SEQUENCE IN AN ORIGINAL TOKEN STRING WITHIN A DATABASE OF TOKEN STRINGS USING APPENDED NON-CONTIGUOUS SUBSTRINGS

This is a continuation of application Ser. No. 07/923,203, filed on Jul. 31, 1992, now abandoned.

BACKGROUND OF THE INVENTION

1. Field of the Invention

This invention relates to the field of searching strings of tokens in a database. Specifically, the invention finds sequences of tokens in a database similar or identical to a predefined reference sequence of tokens.

2. Description of the Prior Art

There are many conventional techniques for finding the occurrence of a particular sequence of tokens, called a reference sequence or reference string, within a database of many strings of tokens. (A token is a symbol, such as a letter, word, sound, bit pattern, or other descriptive designation which for our purposes can appear in a sequence with other tokens.) Some of these techniques were developed to perform specific tasks, e.g. finding an exact or similar sequence of specific tokens, e.g., nucleotides (or amino acids), in a long string of nucleotides (or amino acids) comprising a DNA (or protein) molecule. (Two sequences are similar if they can be made identical by inserting, deleting, or modifying less than a preset number of tokens in one of the sequences.) Some of these conventional matching techniques include: the Needlemann-Wunsch or the original Wilbur-Lipman algorithms, FASTA, FASTP and BLAST.

The Needleman-Wunsch algorithm is a dynamic programming technique. All tokens in the two sequences to be compared are considered pairwise to compute all possible candidate alignments between the two sequences. A cost value is associated to deletions, insertions and modifications. The alignment that produces the smallest global cost value is then chosen. This is an expensive technique since the amount of computation required is proportional to the product of the length of the two sequences to compare.

The Wilbur-Lipman algorithm compares contiguous tuples of small length in the original and reference strings. Tuples are matched for both sequences using a look-up table that is created from the reference string. The score for each candidate match is computed and the best score is selected. A new look-up is therefore created each time a new reference sequence must be compared against the database. Since the entire set of original string must be checked against the look-up table the amount of computation required to match against a database containing a total of 2N nucleotides or amino acids will be double that required for a database with only N nucleotides or amino acids. In other words, the number of comparisons against the look-up table required is at least equal to the total number of nucleotides (amino acids) present in all the original strings.

The FASTP and FASTA algorithms are refinements of the original WILBUR-LIPMAN technique. Increased sensitivity is achieved by means of a replaceability matrix to score the alignments. Mutations that appear frequently in evolution (deletions, insertions, and replacements of nucleotides) are given a better scores, while less frequent ones are given worst scores. The nature of the approach, however is still sequential.

The BLAST technique does an in-depth comparison of the original and reference sequence only if they satisfy an initial minimal similarity test which can be performed very quickly. This is done by heuristically determining whether the length of the MSP (maximal segment pair) is above a given threshold. The MSP is the pair of identical length substrings of the reference string and sequence string that has the best score for mutations. If this test is successful a more complete and costly similarity analysis is performed using FASTP-FASTA type algorithms. This reduces the amount of computation at risk of missing some matches that do not satisfy the initial criteria. About 20% of the similarities detected with the Needleman-Wunch algorithm are not picked up by BLAST. Also the approach remains inherently sequential since some computation must be performed for each token in the set of original strings.

3. Statement of Problems with the Prior Art

The prior art has been successful in efficiently comparing two token sequences (the tokens specifically being nucleotides or amino acids) on a one-to-one basis, i.e., sequentially. However, much of the prior art has difficulty in finding all or even most of the possible matches of a reference sequence of tokens in a database of original token strings without performing some computation on each or most tokens in the original sequences. Current computer technology is unable to perform these tasks on very large databases within a reasonable amount of time.

Accordingly, there has a long felt need for an indexed method of determining a similar or exact match between a reference string of tokens and a sequence of tokens in one or more original strings of tokens in very large databases. There has also been a need to quickly and efficiently determine the location of these similar or identical sequences on the original string of tokens and the degree of similarity these strings have to a reference string. Specifically, in the area of genome mapping, these has been a long felt need for a method, using current computer technology, to detect similarities among nucleotide sequences in a database containing up to 4 billion nucleotides.

The prior art fails to quickly and efficiently locate sequences of tokens on original strings in large databases when searching for a match to a reference string of tokens. This is because the prior art must scan the entire database of original strings in the matching procedure. The prior art must scan the entire database to locate matching strings of tokens, because it fails to provide a indexing technique that quickly and accurately identifies only those original strings that contain possible match sequences of tokens.

OBJECTIVES

An objective of this invention is an improved method for finding sequences of tokens identical or similar to a reference sequence of tokens in one or more original strings of tokens within a database having one or more original strings.

A further objective of this invention is an improved method for finding sequences of tokens identical or similar to a reference sequence of tokens in original strings of tokens within a database having one or more original strings by using indexing and hashing.

Also an objective of this invention is an improved method for finding sequences of nucleotides (or amino acids) that are identical or similar to a reference sequence of nucleotides (or amino acids) in a database having a plurality of original strings of nucleotides (or amino acids) representing a DNA (or protein) molecule.

Also an objective of this invention is an improved method of speech recognition by finding sequences of phonemes similar to a reference sequence of phonemes in a database of original speech phonemes sequences.

Also an objective of this invention is an improved method of music recognition by finding sequences of notes similar to a reference sequence of notes in a database of original note sequences.

SUMMARY OF THE INVENTION

This invention is a novel method, performed on a general purpose computer, that is able to find identical or similar occurrences of a sequence of tokens to another token sequence, called a reference sequence, in one or more original token strings within a database of original token strings. The invention has a high probability of quickly and precisely finding all occurrences of the token sequences in the original token strings which exactly (identically) match or similarly match the reference sequence of tokens.

A large number of indexes are generated for each original string and are used to store a information record referring to the original string in a look-up table. During recognition, a large number of indexes are formed from a reference string. These are used to recover the information in the look-up table and to accumulate evidence for one or more original strings. In this way, much of the processing can be done prior to recognition which allows a much faster recognition time.

To form indexes the method first forms "tuples." To do this, initially a number of original substrings of contiguous tokens are selected from an original token sequence in the database. Each member of this set of original substrings is a relatively small number of tokens in length but is at least one token long. The set members can all be a fixed number of tokens in length. However, some or all of the set members can be different numbers of tokens in length. Using this set of original substrings of tokens, a set of tuples is formed. At least one tuple in the set is formed by appending at least two different, non contiguous set members together. (Other substrings in this tuple or in the set of tuples may or may not be contiguous.) These tuples are also called "j-tuples" where j is the number of original substrings which are used to form the tuple. Tuples formed from an original string are called original tuples.

A unique index is then created and assigned to each tuple based on the values of the tokens in the tuple. Indexes assigned to original tuples are called original indexes. Typically the original indexes are generated from the values of the tokens in the j-tuples by means of an algorithm and take the form of a value, like a number (typically an integer). Each original index is associated with a unique cell in a memory look-up structure, typically an array. The index is used to identify and/or access its unique associated cell in the look-up structure. An information record describing an original string from which the tuple (and the original index) was created is stored in the memory look-up structure cell associated with the index. A cell is capable of keeping either a fixed or an arbitrary number of these information records. For instance, an information record stored in the cell would include a reference to the original string. This reference, also here referred to as a pointer, is a means to identify one of the original strings. Note that a reference can be implemented as pointer (the address in memory) of a given token of the original string or an an index in a table of pointers or as any other implementation known in the art. The pointer (reference) locates the original string in the database from which the original tuple uniquely defined by the original index was derived. The look-up structure can also include other information, called displacement information, which locates the position of the tuple (used to generate the index) on the original string. This position information can include 1. a displacement from a given original string location (token) to the first token of the first original substring of tokens used to form the tuple or 2. a displacement equal to the average position of the first token of all the original substrings that form the tuple, or 3. any other displacement that can be computed using the position of some tokens on one or more of the original substrings.

After all the desired original strings have been thus processed, the reference sequence is matched to the original strings. To do this, tuples called reference tuples and their uniquely identifying reference indexes, are formed from a reference sequence using the same or a similar procedure to that described above.

The reference indexes are compared to the original indexes by using the look-up structure described above. A reference index is used to point to a cell in the look-up structure. If the reference index points to a cell which contains one or more information records about original strings, there are one or more respective matches. If the reference index points to a cell with no information, there is no For each information record stored in the cell indexed by the reference index a vote is recorded in a second data structure called an Evidence Integration Table (EIT) which is used to track the number of matches for a given original string. Typically this is a hash table. Allocated cells in this second structure correspond to hypotheses about original strings that match the reference string. The cells also contain a value that reflects the number of times corresponding hypotheses has been voted for. For example, vote entries in a voting cell in this second structure correspond to votes for particular strings in the original database. The more similar the reference sequence is to a token sequence in an original string in the database, the higher the probability that more matches will occur between the reference indexes of the reference sequence and the original indexes of the original string. Voting cells in the second memory structure corresponding to original strings similar or identical to reference strings will have a relatively high number of votes. Conversely, the less similar the reference sequence is to token sequences in the original string, the less probability of a match between the reference indexes and the original indexes associated uniquely with each tuple formed from the original string. Voting cells in the EIT, correspond to these cases, will have few votes or no votes at all. Therefore, the number of votes in each voting cell of the EIT has a direct correlation to the degree of similarity between the original; string represented by the cell and the reference sequence.

Lastly, information in the EIT is used to locate token sequences on an original string in the database which correspond (exactly or similarly) to the reference sequence of tokens. First, cells in the EIT with a value above a predefined threshold are selected. Then, the associated pointer(s) is (are) used to locate one (several) original string(s) in the database. Finally, the matched token sequence on the original string is found by using displacement information associated with the selected index(es).

BRIEF DESCRIPTION OF THE DRAWINGS

FIG. 1, comprising

FIG. 6, comprising

FIG. 7, comprising

FIGS. 8A–8B is a table of symbols.

DETAILED DESCRIPTION OF THE INVENTION

This method is intended to operate on any general purpose computer capable of performing the required hashing and look-up functions required by the method. The computer will also require enough memory to store all the tokens in the original strings, and the data structures used by the method.

Figure 1A:
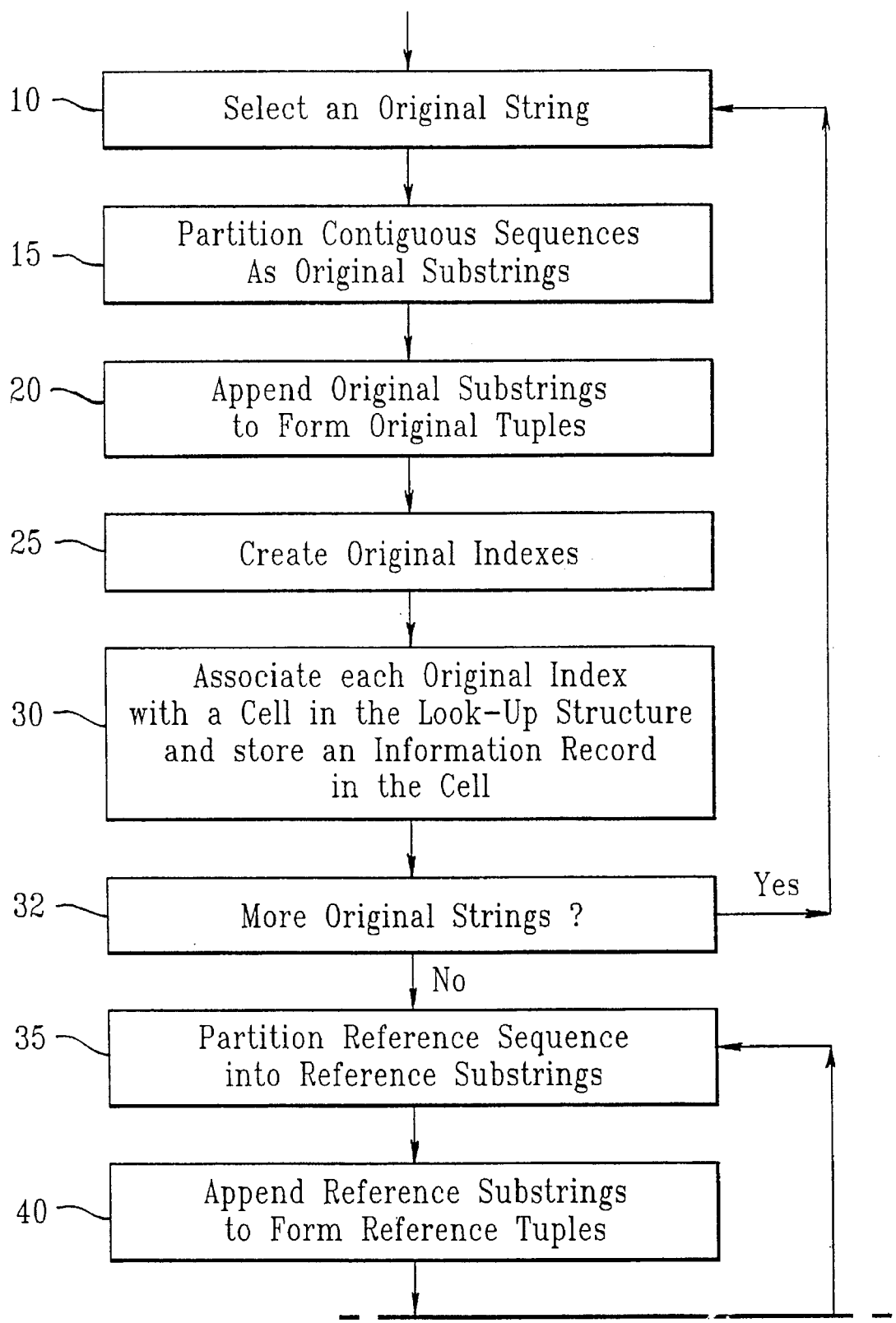
FIGS. 1A and 1B, shows a flow chart of the overall method of the invention.
Figure 1B:
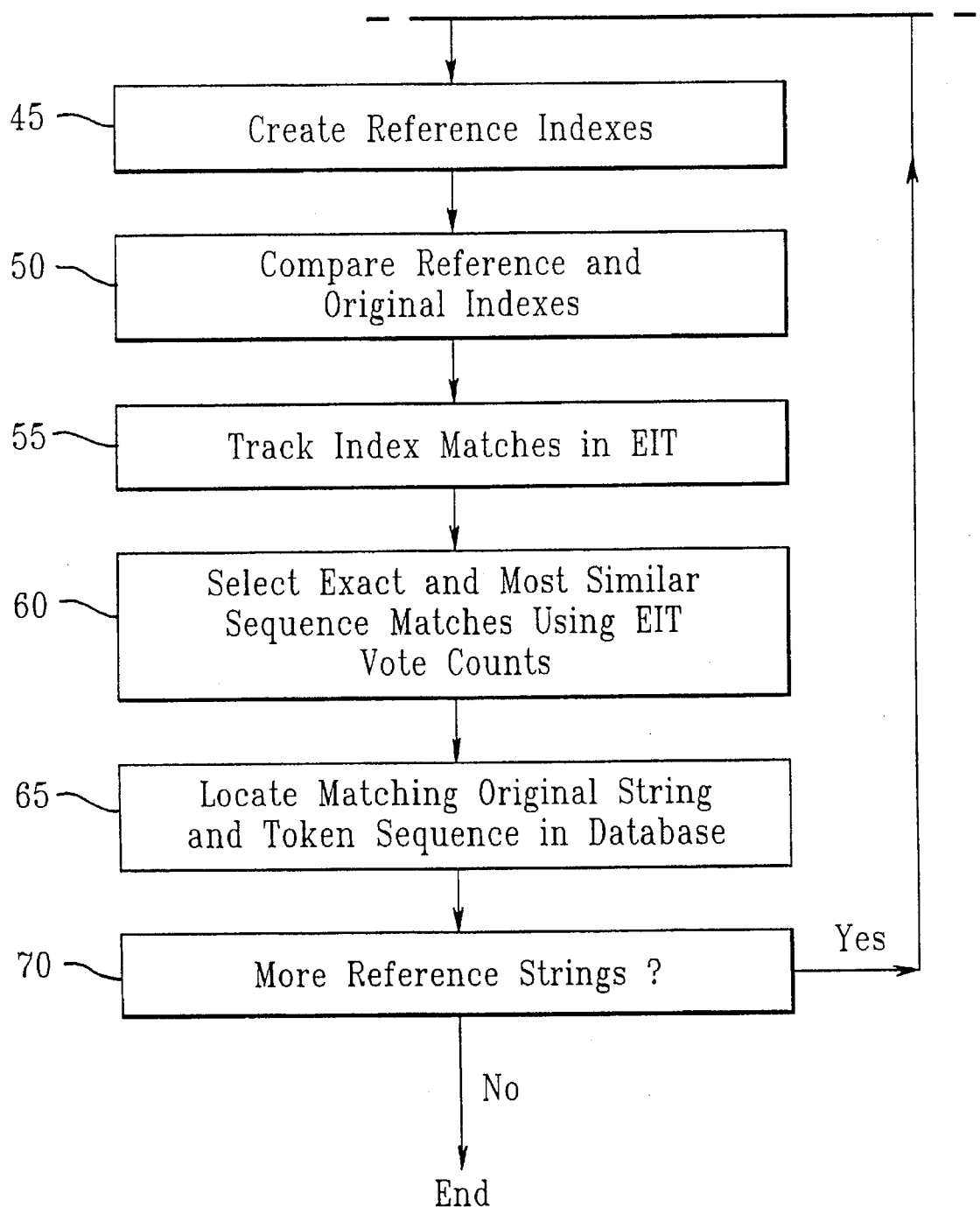

The general method of the invention is shown in the block diagram of FIG. 1. The method starts by selecting an original string 10 from a database. The string is then partitioned into substrings of contiguous tokens 15 at least two of which are non contiguously appended together to form original tuples 20. The original tuples are used to create original indexes 25 which are then used to store information, associated with the index and the original string, in a cell in the look-up structure 30. This procedure is repeated 32 for every original string of interest in the database. In a similar manner, reference indexes are created from a reference sequence. Specifically, the reference sequence is partitioned into substrings of contiguous tokens 35 at least two of which are non contiguously appended together 40 to form reference tuples. Using the same method of creating original indexes from original tuples, reference indexes are created from reference tuples 45. The reference indexes are then compared to the original indexes 50. The number of a reference indexes matching original indexes is tracked 55 in an Evidence Integration Table (EIT). The matching and tracking can be repeated until all (or some subset) of the reference indexes have been compared to the original indexes. Values of recorded numbers of matches between original and reference indexes are then used to find original strings which are most similar to the reference string 60. Other information associated with the original index is used to locate the position on the original string of the token sequence closely or exactly matching the reference sequence 65. Other reference strings are processed and matched to the original strings in the same way 70.

The method initially starts out with a database of original strings, X, of different (or the same) length of tokens. Typically these sequences are stored in a location in computer memory in any appropriate way for storing sequences of tokens. For instance, to represent a large number of protein strings in the database, each of the possible amino acid tokens in the protein is assigned an alphanumeric character. These characters can be standard ASCII characters. Each protein string is then represented as a string of ASCII characters in consecutive memory locations in the computer. The start of one protein string can be designated with a pointer that points to the starting ASCII character (token) in the string, while the end of the string can be designated by some delimiter, like the character "0". In general, the set of original strings X in the database is represented as $X \equiv \{\chi i; i=1, \ldots, N_\chi\}$.

Figure 2:
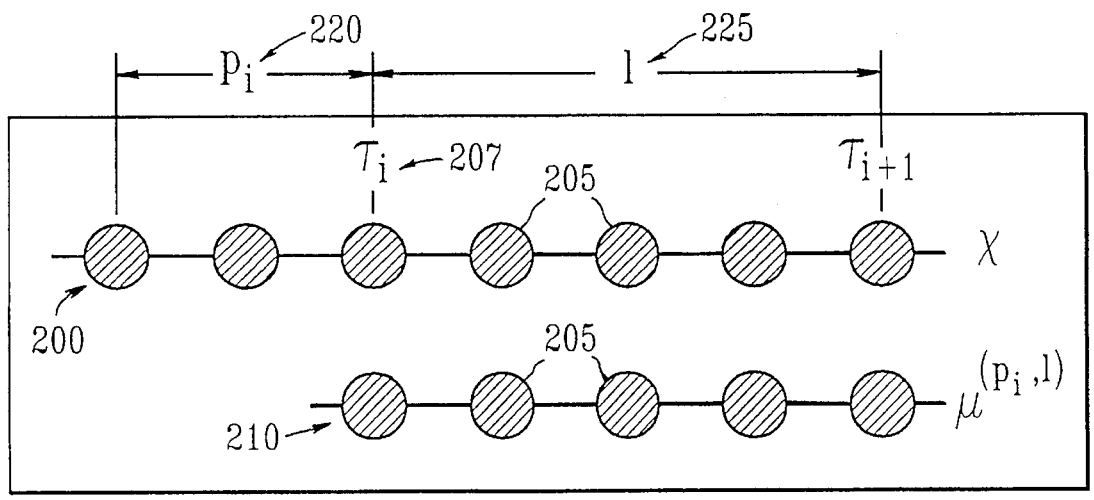
FIG. 2 shows an original string of tokens and a substring of tokens beginning at position $p_i$ on the original string and having a length of l tokens.

Next, each original token string, $\chi$, in the database, X, is partitioned into two or more original substrings of contiguous tokens, $\mu$. To illustrate this, FIG. 2 shows an original token string 200, $\chi$, where each token (typically 205) is designated by $\tau$. Token $\tau_i$ 207 designates the token $\tau$ in the i th position 220 of the original token string sequence 200 or $p_i$. Also shown in FIG. 2 is $\mu^{(p_i,l)}$ designating a original substring of contiguous, sequential tokens 210 taken from the original string starting with the token at position 220 ($p_i$) and having a length 225 of l tokens. By partitioning the original string, a set of original substrings 210 is formed. It is represented by $M \equiv \mu^{(p_1,l_1)}, \mu^{(p_2,l_2)}, \ldots \mu^{(p_k,l_k)}$. Each original substring starts at a position $p_k$ on the original string and each substring has a respective length, $l_k$. For example, the original substring $\mu^{(5,14)}$ is a substring of tokens taken from the original string starting with the token in the 5 th position on the original string and including the next 13 tokens following in the original string, thus making the substring 14 tokens long. In some cases, the length $l_k$ of some or all original substrings is equal to the length of other original substrings in the set. An original substring must be at least one token long.

A set of K original tuples, each designated by $\xi_k$ are formed by appending j original substrings together where j is two or greater. At least one of the tuples in the set is formed by appending at least two non contiguous original substrings together. Other contiguous substrings may or may not be appended to this tuple. Other tuples in the set also may or may not be formed by appending contiguous substrings together. See box 20 in FIG. 1. Note that two sequences are considered contiguous if the first token of the second substring follows the last token of the first substring in in the original string.

An original tuple formed by a number j of original substrings is called an original j-tuple. A j-tuple of length L will be represented by the symbol $\xi^{(j,L)}$. Here the original substrings in the j-tuple will be described as $\mu^{(p_1,l_1)}, \mu^{(p_2,l_2)}, \ldots, \mu^{(p_j,l_j)}$. Note, in certain cases, the original substring lengths can be equal.

Tuples can be formed by appending substrings using a variety of algorithms, but these algorithms essentially fall into two groups—probabilistic and deterministic. The tuples generated from probabilistic algorithms tend to be random, i.e., using the same algorithm on the same set of original substrings probably will generate a different set of tuples each time the algorithm is used. On the other hand, a deterministic algorithm will always generate the same set of tuples from a given set of original substrings each time the deterministic algorithm is used.

As an example, a probabilistic algorithm is used to create a set of 3-tuples (a tuple created by appending 3 substrings together) from a set of 17 substrings each two tokens in length. The algorithm randomly selects one of 17 substrings, then one of the remaining 16 substrings, then one of the remaining 15 substrings and appends the three selected substrings together to form the first 3-tuple of the set. The procedure is then repeated an arbitrary number of times, e.g.

100 times, until 100 3-tuples are formed. It is very likely that the first set of 100 3-tuples formed from an original string (substrings) in this manner will be different than the next set of 100 3-tuples formed from the same original string by using the same algorithm again. Nonetheless, this type of probabilistic algorithm will form a set of j-tuples that can be used by the present invention.

The deterministic algorithm is the preferred algorithm for generating tuples in this method. One example of a deterministic algorithm used to create 3-tuples from 17 original substrings of length 2 would append the substrings which start at the 1 st, 5 th, and 9 th tokens on the original string and the substrings which start at the 3 rd, 7th, and 11th substrings on the original string. This simple algorithm generates a set of two 3-tuples which are the same each time the algorithm is run using the same original string and original substrings. A great number of deterministic algorithms of this nature using varying lengths of substrings, varying numbers (two or more) of substrings appended to form a tuple, and varying ways of appending the substrings together can be designed by one skilled in these methods, given this disclosure. Use of these many variations is contemplated in the present invention.

However, there is a more preferred deterministic algorithm for generating tuples for this invention which is now presented. This more preferred algorithm, which is effective in limiting the number of tuples used to achieve a given level of accuracy, is generally defined as follows:

For any given sequence of length $L_S$, desired j-tuple of length L, and order j of tuple, determine a series of integers, i.e., substring lengths $(l_1, l_2, \ldots l_j)$, such that $$\Sigma l_m = L \text{ (where m=1 to j)}.$$

Then form all of a set of k of j-tuples described as $$\xi_k^{(j,L)} = \mu^{(p_1,l_1)} + \mu^{(p_2,l_2)} + \ldots + \mu^{(p_j,l_j)}$$

where for each member k of the set of j-tuples, the first token positions, $(p_1, p_2, \ldots, p_j)$ of the substrings partitioned from the original string and forming the tuple are selected to conform to the following rules:

1. $\forall$ a and b such that $1 \leq a < b \leq j$ then $p_a < p_b$
2. $\forall$ a such that $1 \leq a \leq j$ then $p_a + l_a \leq j$
3. $\forall$ a and b such that $1 \leq b \leq j$ then $\lambda_{ab}^- < p_b - p_a < \lambda_{ab}^+$ with $\lambda_{ab}^-$ and $\lambda_{ab}^+$ a set of j(j−1) lower and upper thresholds defined a priori.

These preferred rules for generating tuples in a deterministic way can alternatively be stated as follows:

1. Equation 1 states that if the starting position of one of the substrings that form the tuple is $p_a$, subsequent substrings used to form the j-tuple can only have a starting position larger than $p_a$, i.e., the subsequent substrings in the tuple have to begin further away from the beginning of the original string. This generates ordered tuples.
2. Equation 2 states that no substring can begin at a position that would make the substring exceed the total length of the original string.
3. Equation 3 states that given two a priori thresholds $\lambda_{ab}^-$ and $\lambda_{ab}^+$, termed the minimum and maximum radius of coherence, the starting positions, $p_a$ and $p_b$, of two successive substrings can differ by no more than $\lambda_{ab}^+$ and no less than $\lambda_{ab}^-$. Equation 3 is the most relevant for limiting the number of tuples generated in this algorithm.

An example will illustrate this more preferred deterministic algorithm. An original string has an 18 token length, i.e., $L_S = 18$. A set of 3-tuples are formed from a set of 17 original substrings each having a length of 2 tokens. All tuples in the generated set of original tuples will have a length of 6 tokens (L=6) and will be formed by appending 3 substrings together (j=3). Note that there are 17 substrings because the substring set is created by selecting the first substring starting at token location p=1, the second substring starting at p=2, etc. until the last substring starting at p=17 is selected. In other words, the original substring set, M, consists of the following 17 substrings: $\mu^{(1,2)}$, $\mu^{(2,2)}$, ..., $\mu^{(d17,2)}$. Taking all possible ordered combinations of 3 contiguous and non contiguous substrings from this set of 17 substrings, it is possible to create 680 3-tuples. In other words, $$\binom{17}{3} = 17!/((17-3)!3!) = 680.$$

However, applying the above three rules, a deterministic set of 42 3-tuples is created by defining the radii of coherence as $\lambda_{12}^- = \lambda_{23}^- = 0$, $\lambda_{12}^+ = \lambda_{23}^+ = 3$, $\lambda_{13}^- = 0$, and $\lambda_{13}^+ = 20$. Using these rule 3 criteria, an allowed 3-tuple is $\xi_{Good}^{(3,6)} = \mu^{(5,2)} + \mu^{(7,2)} + \mu^{(8,2)}$, while the tuple $\xi_{Bad}^{(3,6)} = \mu^{(5,2)} + \mu^{(9,2)} + \mu^{(10,2)}$ would not be allowed since $p_2 - p_1 = 4 \geq \lambda_{12} = 3$. By appropriately selecting the values for the radii of coherence, the total number of tuples and indices generated can be chosen at will.

The next step, as shown in box 25 of FIG. 1, is to create unique original indexes for each of the tuples created from an original string. Given the disclosure of this invention, there are a great many techniques which can be developed by those skilled in the computer programming arts that can be used to create original indexes for each of these original tuples. These techniques typically use mapping, has tables or algorithms to convert values of each original tuple into a original index which uniquely identifies the tuple from which it came.

In the preferred embodiment, unique indexes, γ, are generated by first assigning a value, like a numerical value, to each possible token value in the original string. Doing this, the original string, and hence the substrings and tuples, become a sequence of numerical values which represent their respective tokens. Generally, a unique number, $\tau_i$, between 0 and $n_\tau (0 \leq \tau_i < n_\tau)$ is select for each token, τ. For example, in a DNA sequence of nucleotide tokens, the four possible nucleotide tokens (A, C, G, T) are assigned the numerical values 0, 1, 2, and 3, respectively. In another example for a protein string sequence of amino acid tokens, the 20 possible amino acid tokens are assigned the numerical values of 0 through 19, respectively.

An index generating algorithm is then defined which converts the sequence of numerical values (tokens) into a unique index. An index generating algorithm is presented as a non limiting example. Many other algorithms can be developed by one skilled in the art given the disclosure of this invention. A preferred index generating algorithm used is:

$$\gamma = \Sigma n_\tau^{(i-1)} \tau_i \text{(where i=1 to L)}$$

For the DNA the example, the index generating algorithm becomes:

$$\gamma = \Sigma 4^{(i-1)} \tau_i \text{ (where i=1 to L)}.$$

For the protein example, the index generating algorithm becomes:

$\gamma = \Sigma 20^{(i-1)} \tau_i$ (where i=1 to L).

For instance, a j-tuple such as "AATCGT", in the DNA example would translate first into the numerical sequence "003123" and would have the unique index:

$4^0 x0 + 4^1 x0 + 4^2 x3 + 4^3 x1 + 4^4 x2 + 4^5 x3 = 3696$.

The index generating algorithm is used to create a unique original index for each original tuple in the set of original tuples $\xi_K^{(j,i)}$, formed from the original substrings (see box 20 of FIG. 1) of the selected original string of interest. The same algorithm and procedure is used to create unique original indexes associated with original tuples for each other selected original string in the database.

Box 30 of FIG. 1 describes how information associated with each original tuple is stored in computer memory (usually in bulk storage like a hard disc) for later access using the unique original index associated with the tuple.

Figure 3:
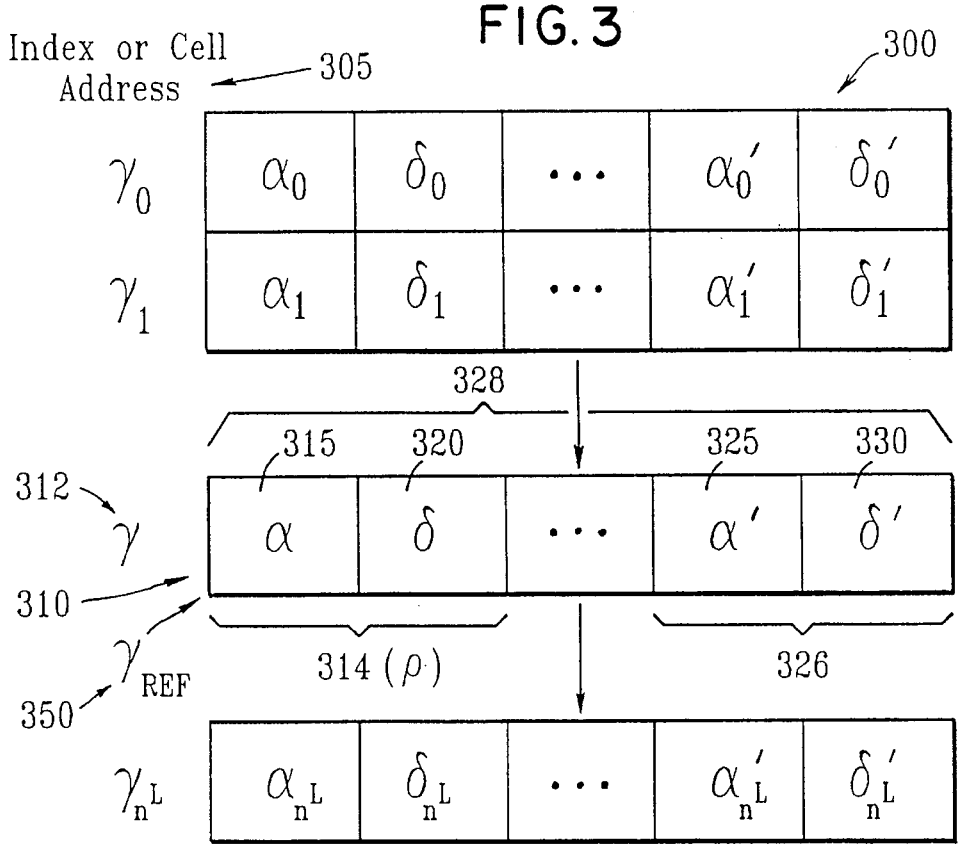
FIG. 3 shows the preferred embodiment of a look-up structure.

FIG. 3 shows an array as first data look-up structure 300 used in the preferred embodiment to store the information associated with each original tuple. Other indexed methods of storing information for later access are well known in the art and are also contemplated by the invention. These include vectors which contain pointers to lists of information records.

The data look-up structure 300, shown in FIG. 3, is an array with a plurality of cells, typically 310. The data look-up structure array 300 has at least $n^L$ cells where L is the length of the longest tuple used and $n=n_\tau$ is the the number of possible token values in the original strings. (In the DNA case n =4 for the number of numerical representations of four possible nucleotides). Doing this guarantees at least one cell to be uniquely associated with each generated original index. Note that in this embodiment there will also be many cells unassociated with any generated original index. If a cell is associated with a generated index, information, called an information record 314, typically ρ, about the original string and tuple from which the index 312, typically γ, was generated is added or appended in the cell. A cell 310 can contain multiple information records 314 and 326. At a minimum, this information record includes a pointer 315 to the original string in the database from which the tuple was created. More preferably, the information record will also contain information 320 about the location on the original string of the original tuple. Even more preferably, additional information about the tuple and location of the substrings appended to generate the tuple will be included in the cell. (See below for a further description). In the preferred embodiment, cells unassociated with any generated index are distinguished by being left blank.

In a more preferred embodiment, the cell 310 includes room for more than one information record about more than one original string which may have generated identical indexes. In other words, the cell contains a list 328 of multiple information records each containing a point (315 and 325). Each information record 326 in the cell list 328 containing a pointer 325 may also contain location information 330 associated with the pointer 325. If more than one original string generates the same index, information about each original string generating the identical index 312 is appended to the list 328 of information records in the single cell 310 location associated with the common index 312. The list 328 can be static or dynamic. A static list contains room to store information pertaining to a fixed number of original strings and looses any information that needs space exceeding the allotted amount. A dynamic list expands in size to include information about any original string which generates a common index.

Although the array type look-up structure 300 is adequate for a small number of possible indexes, applications which have a large number of indexes require a large number of look-up structure cells 310. Further, in many applications, most of these cells 310 will have no information in them because they are not associated with a generated index 312. In these situations, methods known in the art for dealing with sparse arrays are used. These methods include hash tables.

Figure 4:
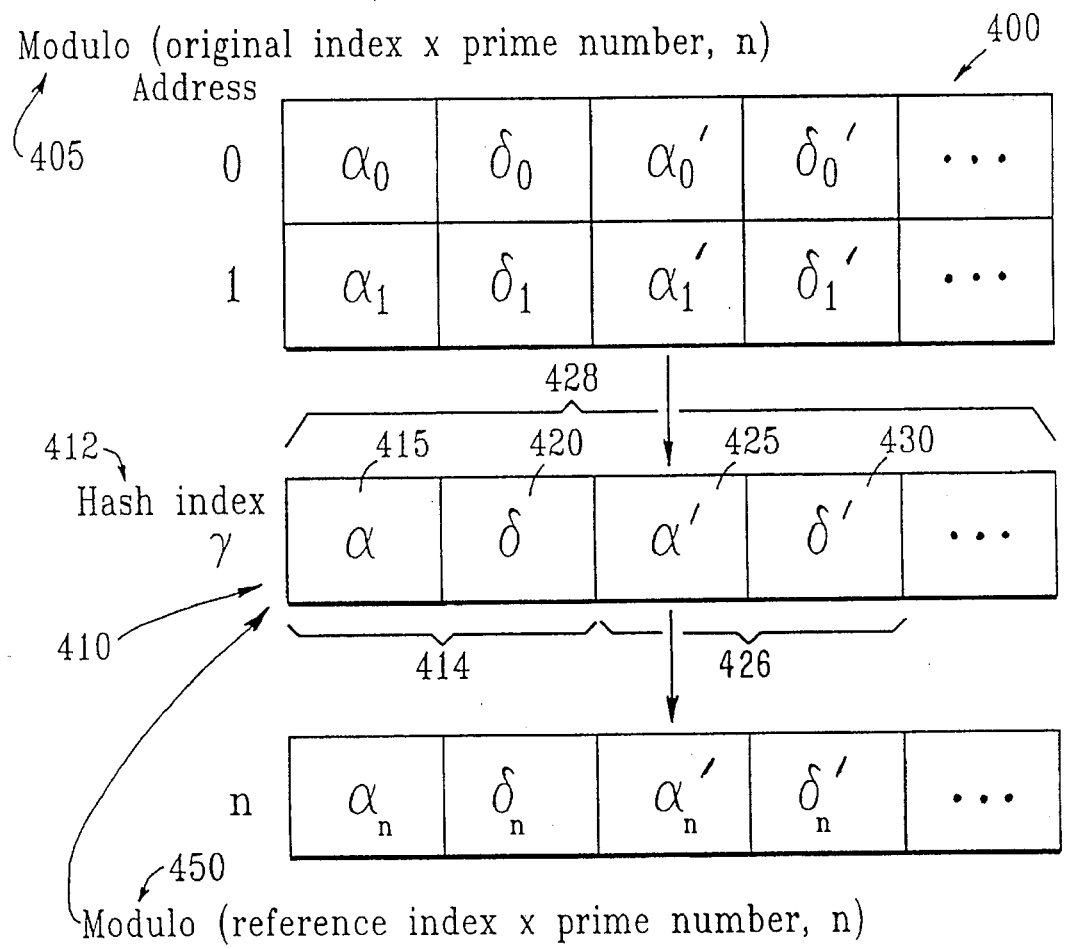
FIG. 4 shows an alternate embodiment of a look-up structure.

There are many hash table embodiments known in the art which are within the contemplation of this invention. However, as an example, FIG. 4 shows the first look-up structure embodied as a particular type of hash table. This example describes a relatively small array of n cells identified as cells 0 through n. Each generated index is multiplied by a prime number, e.g., 7 and then this value, modulo n, is taken 405. The generated hash index 412 is then associated with the cell 410 whose identifying number matches the value of the modulo operation. Information record 414 associated with this index is then placed in the chosen cell. The method assumes that there will be enough cells 410 in the hash table to uniquely be assigned to each generated index. If a generated index is mapped into a cell which is already assigned to another different index, that index is rehashed and reassign. For example, the value of the modulo is multiplied by 7 and the modulo is taken again. The result should be a number identifying a different cell. This is repeated until an empty cell is found.

A description of the information stored in the cell of the first look-up structure is now presented. The information record, ρ, is used to gain access to a specific location in a second storage structure called a Evidence Integration Table (EIT). At a minimum, an information record contains a point 415, α, to the original string used to compute the index of the cell 412. The preferred embodiment stores a point 415 and displacement 420. The displacement 420, δ, is information about the location on the original string of the original substrings which formed the j-tuple associated with the look-up structure cell.

Other information may also be stored in the cells if desired. This might include other information records 426 which would include other pointer 425 and displacement 430 information. These information records 426 can be appended or added to the cell dynamically as needed. Other information may also be included. For instance, the cell 410 might include information about the distance between substrings forming a j-tuple.

References/pointers are well known in the computer arts and this invention contemplates any pointer which can be stored in a memory location like a look-up structure cell and which can be used to locate a sequence of tokens, stored in memory, which represent an original string. One reference/pointer would be the address of the memory location containing the first (or other) token of the original string being pointed to. Alternatively, the preferred reference/pointer is just a number (integer) corresponding to an index of an original string in a database of (integer) numbered strings.

Displacement information describes the average or exact position on an original string of tokens where original substrings used to make a tuple are located. There are many ways to estimate the position of these substrings. For instance, displacement information for a tuple $\xi_K^{(j,L)}$, derived from original string $\chi_i$, is designated as $\delta_k$. This displacement information, $\delta_k$ can be the distance (offset), in tokens, from a given token, like the first token, $\tau_i$, of the original string, $\chi_i$, to another given token, like the first token (or second, or third, etc.) of the first substring used to create the tuple (index) uniquely identified by the cell in the memory structure. The most preferred embodiment uses the average of the distances, in tokens, from the start of the original string to the start of each of the substrings used to generate the tuple. This average is designated $\delta_{kave}$. Therefore, a j-tuple would have a $\delta_{kave}$ computed by averaging the distances in tokens from the first token of the original string to the first token in each of the j substrings.

After the original tuples and associated original indexes for the original strings of interest are generated and the information records for each generated original index is stored in its respective cell in the first look-up structure, reference tuples and their associated unique reference index are created. See boxes 35, 40, and 45 of FIG. 1. This is accomplished by 1. partitioning a given reference string into two or more reference substrings of contiguous tokens, 2. forming at least one reference tuple by appending together at least two non contiguous reference substrings, and 3. generating an reference index using the same index generator used to generate indexes in the look-up structure.

A reference string, $\chi_{ref}$, is a sequence of tokens which is compared with the original strings in the database to determine if the reference string exactly or similarly matches any part (subsequence) of one or more original strings in the database.

See box 35 of FIG. 1. To form reference tuples $\xi_{ref}$, i.e., tuples formed from this reference string, the reference string is first partitioned into substrings of contiguous tokens called reference substrings. This partitioning is performed in any of the ways discussed above for partitioning original substrings. Note that the reference strings may be partitioned into substrings in many ways other than the way that the original strings are. However, in the preferred embodiment both original and reference strings are partitioned in the same way. Refer to box 40 of FIG. 1. Reference tuple $\xi_{ref}$ are now formed by appending together at least two non contiguous reference substrings. This appending of reference substrings is performed in any of the ways discussed above for appending original substrings to form original tuples. However, the reference substrings do not have to be appended into reference tuples in the exact way that the original substrings are appended to form original tuples.

Refer to box 45 in FIG. 1. Reference indexes, $\gamma_{ref}$, are now created from the reference tuples. As before, each reference tuple will have one unique reference index. In fact, the unique reference index created for each reference tuple should be created by using exactly the same index generating algorithm that created the original indexes from the original tuples above.

Reference displacement information, $\Delta$, is also computed to determine the location on the reference string of the reference substrings, used to create the reference tuple. Any general method, e.g., the ones discussed above for developing displacement information for original strings can be used to create location information for the reference substrings. Also, the method used to determine displacement information for reference tuples should be exactly the same as that used to determine displacement information for original tuples.

Once the reference indexes are created, they are compared to the original indexes to determine if they match. Refer to box 50 in FIG. 1. Any method, known in the art, of comparing two indexes (numbers) or two lists of indexes (numbers) to determine which indexes match is contemplated by this invention. However, the preferred method of comparing reference indexes and original indexes uses the look-up structure. To do this, each reference index is used to access the cell (typically 310 in FIG. 3 or 410 in FIG. 4) in the look-up structure which is associated with an original index (312 or 412 typically) equal to the reference index. If there are one or more information records (328 or 428) in the accessed cell, there is a match between the reference index (350 or 450) and one or more original index (typically 312 or 412) (tuple) associated with the accessed cell (typically 310 or 410). If there is no information record in the cell, there is no match and no further processing is done for this reference tuple.

Figure 5:
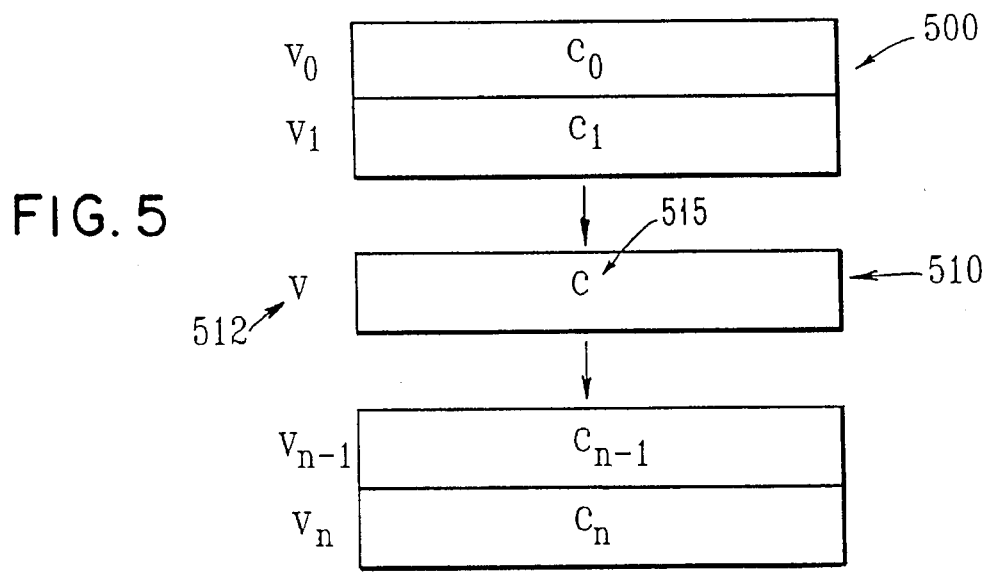
FIG. 5 shows the preferred embodiment of an Evidence Integration Table (EIT).

Refer to box 55 in FIG. 1. At this step in the process, each match between a reference index and an original index is tracked in a second memory storage area called an Evidence Integration Table (EIT). See FIG. 5. Access to the cells 510 in the EIT 500, called voting cells 510, is gained by using a voting index 512 which is developed using part or all of the information record (314 or 414) in the cell (310 or 410) of the look-up structure associated with the matched reference and original index. In general, only the reference/pointer (315 or 415) in the information record must be used as or used to compute a voting index. More preferably, the reference/pointer and displacement information (320 or 420) of the information record and the displacement information of the reference tuple, $\Delta$, is used to compute a voting index 512. However, the most preferred way of developing a voting index 512 to access a cell 510 in the voting table 500 is to use the reference/pointer (315 or 415) and a refinement of the difference between displacement information found in the information record (320 or 420) and the displacement information of the reference tuple, $\Delta$.

The voting index 512 of the preferred embodiment is computed from the reference/pointer (315 or 415), $\alpha$, and the match offset (calculated as the difference of the displacement, $\delta$, of the information record, $\rho$, minus the reference displacement information, $\Delta$). Match offset $D_0$, corresponds to the distance in tokens from a given token on the original string, e.g., the first original string token, to a given token on the reference string, e.g. the first reference string token, such that the matching token sequences on the original and reference strings are aligned when the strings are displaced by the matched offset distance. In other words, the match offset (computed by $D_0 = \delta_{ave} - \Delta_{kave}$.) represents the distance in tokens which the original string has to be moved with respect to the reference string in order to line up the matching sequences from which the respective matching original and reference tuples (indexes) where derived.

Once the match offset, $D_0$, is determined, the voting index 512 is generated by an algorithm. There are many ways in the prior art to generate indexes of this nature contemplated by the invention. However, the preferred method is to multiply the reference/pointer value 315 or 415, $\alpha$, in the information record (328 or 428) by a given constant equal to the largest possible match offset and then to add the match offset value. The constant is chosen so that the algorithm generates a unique voting index for each possible pointer and match offset combination that can be generated from the look-up structure information records. Note that, by inverting the algorithm, the reference/pointer and match offset values can be determined from the voting index. Each cell in the EIT uniquely identifies one original string at a given match offset with respect to the reference string.

The voting cells 510 in the EIT 500, which are accessed by the voting indexes are used to store "votes" 515 for an original string at a given match offset every time a corresponding match is registered by using the look-up structure and reference index as explained above. The value "c" 515 in each voting cell 510 of the EIT 500 is updated each time a voting index for that cell is generated. When a match occurs, i.e., a cell in the look-up structure has at least one information record entry, a voting index 512 is generated, using the reference/pointer in the information record and the computed match offset. The unique voting cell associated with the reference/pointer and match offset is accessed by the voting index and its value c is incremented by a given amount, typically the integer value 1. Accordingly, the value c 515 in each voting cell 510 is a direct indication of how many times an original string and a reference string produced identical indexes and the same value of match offset. Therefore, in the preferred embodiment, a cell in the EIT having a high value of c indicates that the corresponding original string has a high likelihood of being similar or identical to the reference string when displaced by the match offset.

There are many structures known in the art which could serve as embodiments for the EIT, e.g., an array, a vector, or a hash table. Arrays and their one dimensional subset, vectors, are required to be quite large for large databases using the preferred embodiment because a unique voting cell is required for every pointer and match offset combination possible. Most of these cells will not be accessed in a typical application of the present invention because it is very improbable that all of these voting cells 510 will be associated with an original and reference tuple (index) match. As a result, the array (vector) will be sparsely filled and a great deal of space will be wasted. The preferred embodiment uses a hash table to reduce the storage requirement. Hash table techniques are known in the art and examples are discussed above. The hash table can be static or dynamic. A static hash table has a fixed number of voting cells. On the other hand, a dynamic has table starts off with no or a few voting cells and as matches occur, more voting cells are defined and added to the table. The preferred embodiment uses a dynamic hash table.

Referring to box 60 in FIG. 1, all of the cells in the EIT having a value of c above a given threshold are selected as indications of matching original strings. Then a rating of similarity, which is directly proportional to the value c, can be computed.

Refer to box 65 in FIG. 1. By inverting the value of the voting index of the cell, as explained above, it is possible to determine exactly the reference/pointer to the original strings and their respective match offsets.

There are basically two types of match which can occur between a sequence of tokens in an original string, $\chi^o$, and a sequence of tokens in a reference string, $\chi_{ref}^o$. They are exact matches and similar matches.

Exact matches occur when every token of a sequence in a reference string, $\chi_{ref}^o$, has the same value and is in the same order as every token of a sequence in an original string, $\chi^o$. For an exact match, every reference tuple (index) will find at least one reference/pointer to the identical original string in the cell indexed by it. As a result, the value of "c" in the voting cell corresponding to the identical original string will be very high and at least equal to the number of reference tuples created using the matching tokens.

Similar matches occur if the original string, $\chi^o$, can be changed to exactly match the reference string by inserting, deleting, or modifying fewer than a small number of tokens in the original string. For similar matches, it is unlikely that every reference tuple (index) will find a reference/pointer to the similar original string in the cell that it was indexed by it. However, greater similarity between the original and reference strings will cause a greater number of correct matches and consequently a larger number of votes for the original string in the EIT. Therefore, by comparing the number of votes in the EIT that different original strings receive when compared to a given reference string, a degree of similarity between each original string and the reference string can be established. The original strings receiving a higher number of votes in the EIT (after all reference tuples are compared) are more similar to the reference string than original strings receiving a lower number of votes.

IN summary, after the exactly and similarly matching original strings have been determined, they are located in the database. Refer to boxes 60 and 65 in FIG. 1. To do this, the cells in the EIT with the values of "c" above a given threshold are selected. The voting index of these selected cells is then inverted to determine the location (or other designation used) of the original string which caused this vote and the displacement information (if any) used to line up the reference and original strings to line up the matching sequences. It is also possible to locate the matching original string and sequence(s) using the information record in the look-up table in the cell which caused the vote.

If there are more reference strings to compare, see box 70, the process starts over again at box 35.

EXAMPLE 1

A non-limiting example of a string search using this method is now presented as an illustration. This illustration has applications in string recognition methods such as dictionaries and spell checkers.

The original string is "HOTEL" and the reference string is "HOSTEL". The substrings for both are each chosen to be one token in length and the tuples are chosen to be three tokens in length. Therefore, The original substrings are: H, O, T, E, and L.

The reference substrings are: H, O, S, T, E, and L.

The deterministic algorithm used to generate tuples (both original and reference) is the selection of all possible unique, ordered combinations of three substrings. Therefore, The original tuples are: HOT, HOE, HOL, HTE, HTL, HEL, OTE, OTL, and TEL.

The reference tuples are: HOS, HOT, HOE, HOL, HST, HSE, HSL, HTE, HTL, HEL, OST, OSE, OSL, OTE, OTL, STE, STL, STE, STL, TEL For convenience, numeric indexes are not generated from the tuples. Information records are placed in cells in the look-up table. For simplicity, the information record only includes a pointer to the starting location of the original string, HOTEL, in the database.

Comparing each reference tuple (index) to the original tuples results in 9 matches. These results are placed in the EIT. In this example, 9 matches shows a high degree of correlation. A reference string like "SOLID" would have no matches.

This gives a total of 9 matches on the word HOTEL showing strong similarity. Note that using contiguous sequences of three characters would yield one single match on TEL. Any subsequent change of letter (e.g., E into A) would result in no match at all for the contiguous sequence case and in three matches for the non-contiguous case.

Figure 6A:
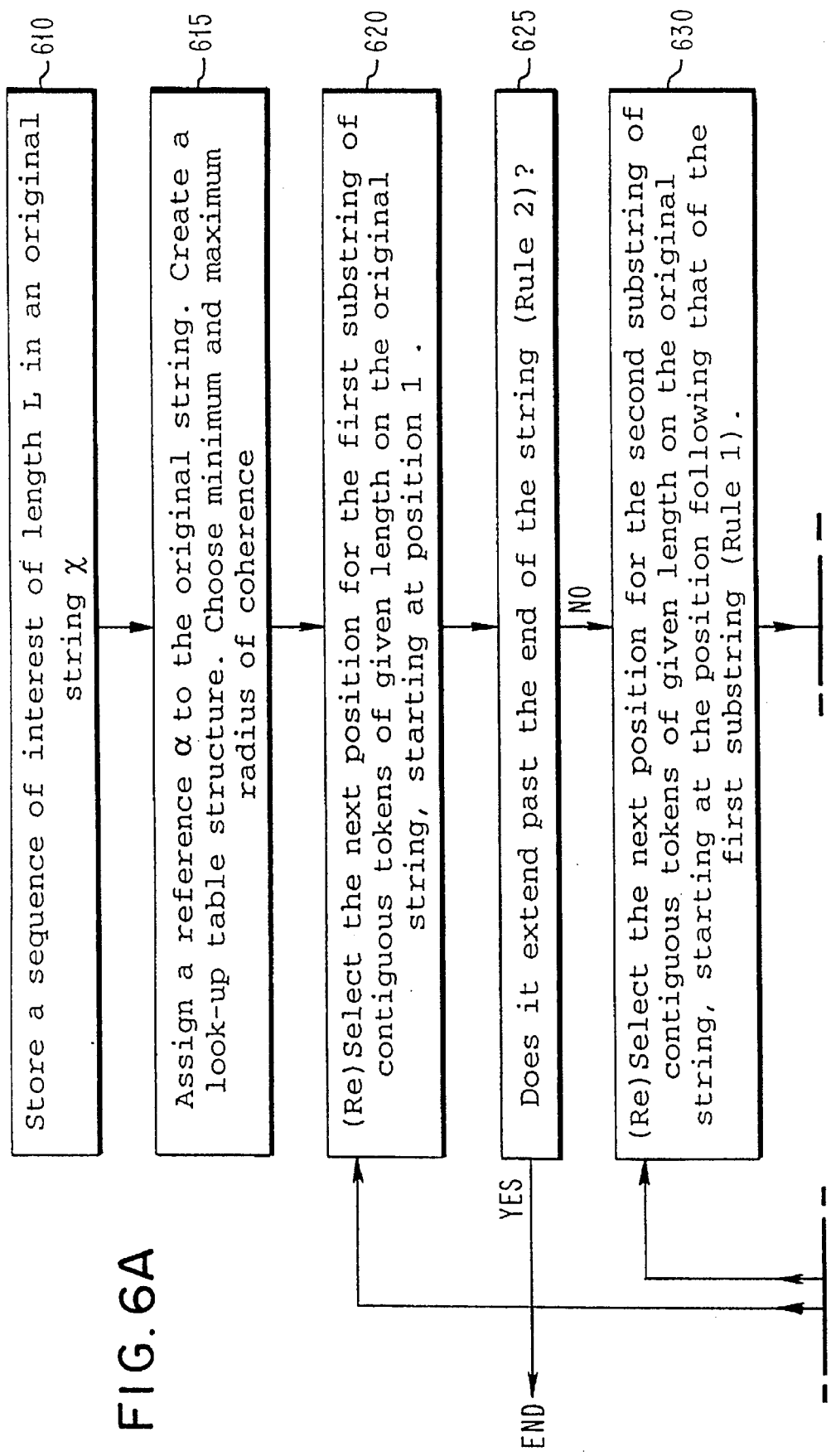
FIGS. 6A, 6B, and 6C, is a flow chart of the computer program which creates original tuples and original indexes and stores the associated information records in the look-up structure.
Figure 6B:
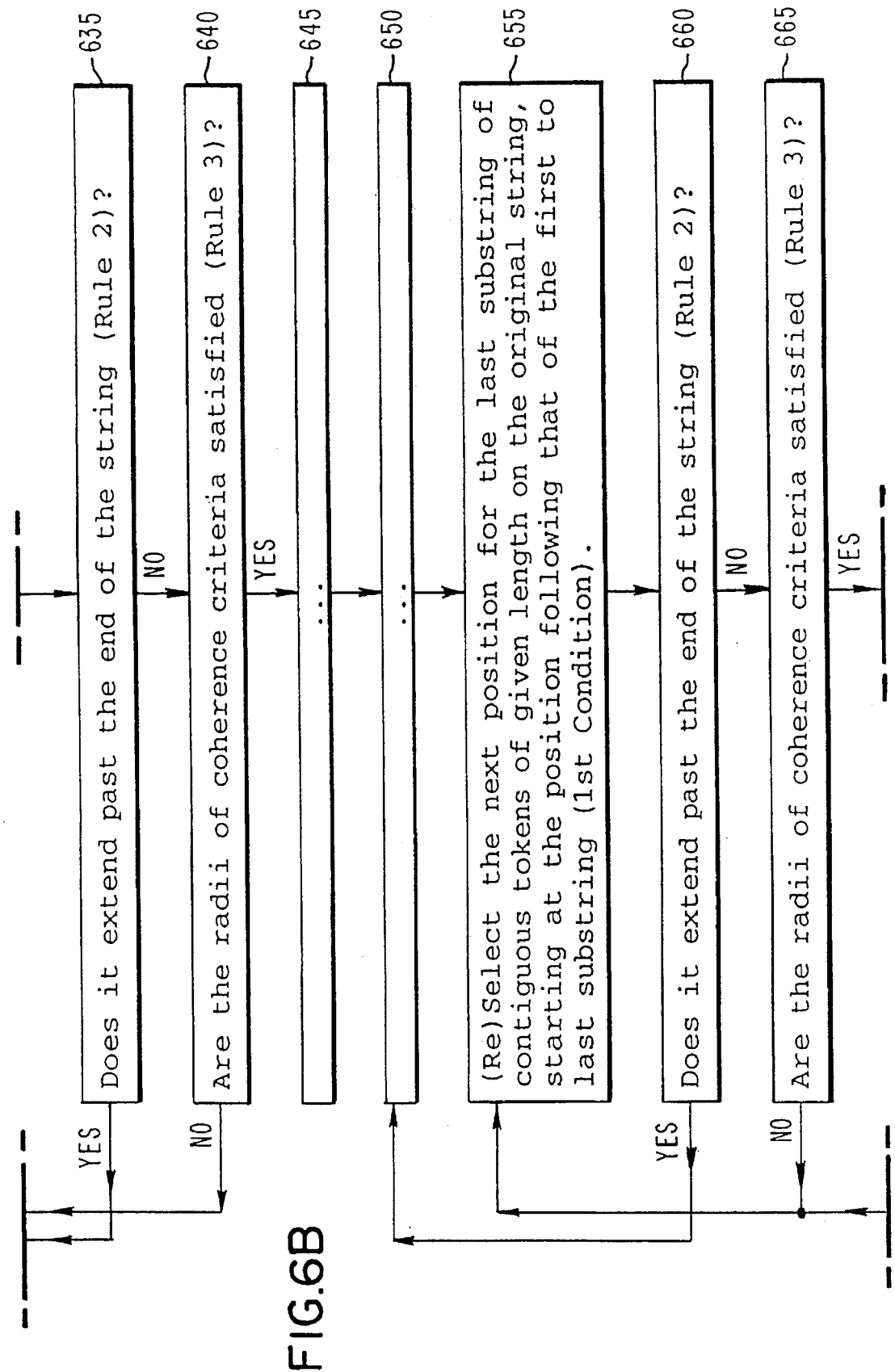
Figure 6C:
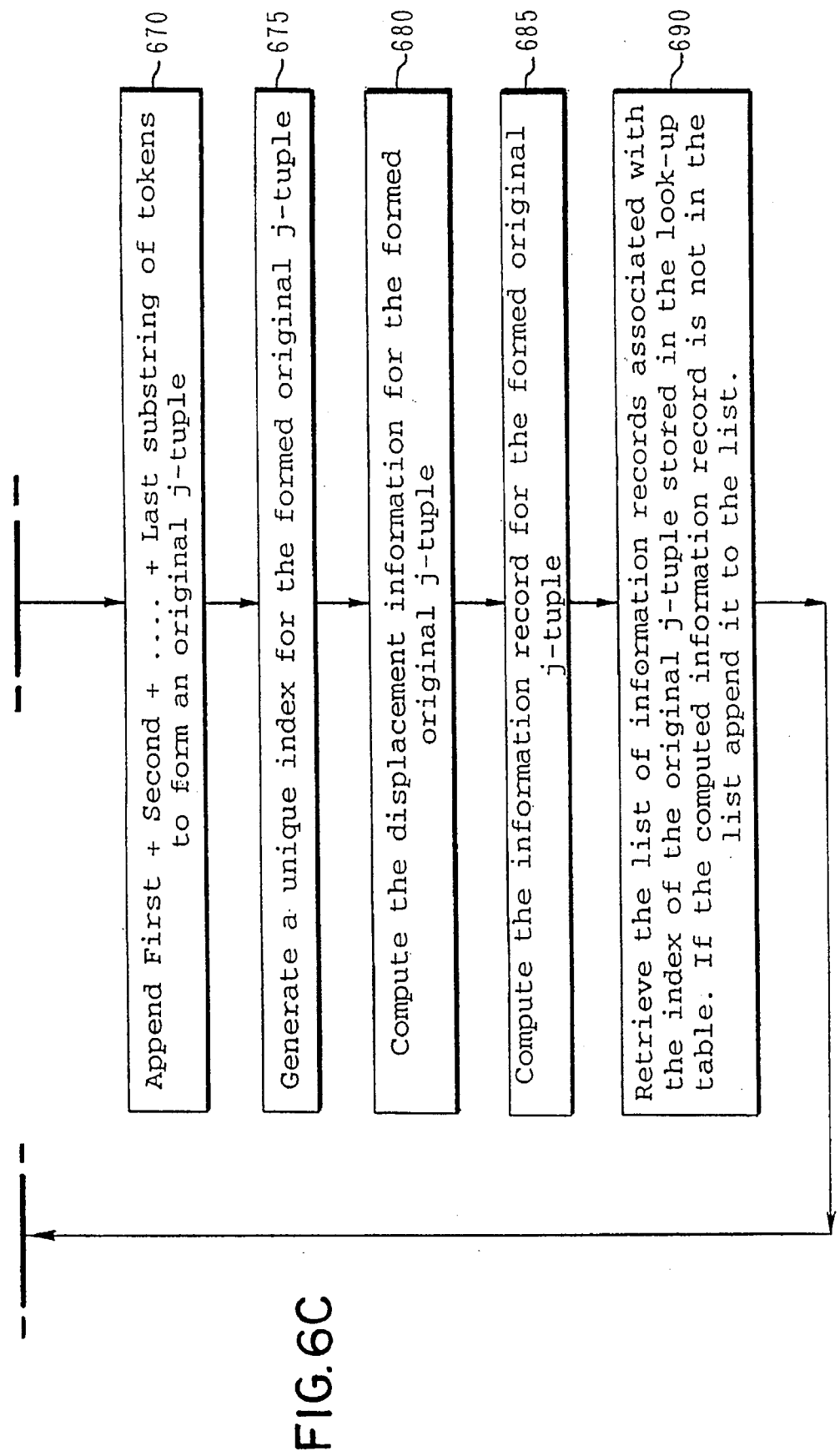
Figure 7A:
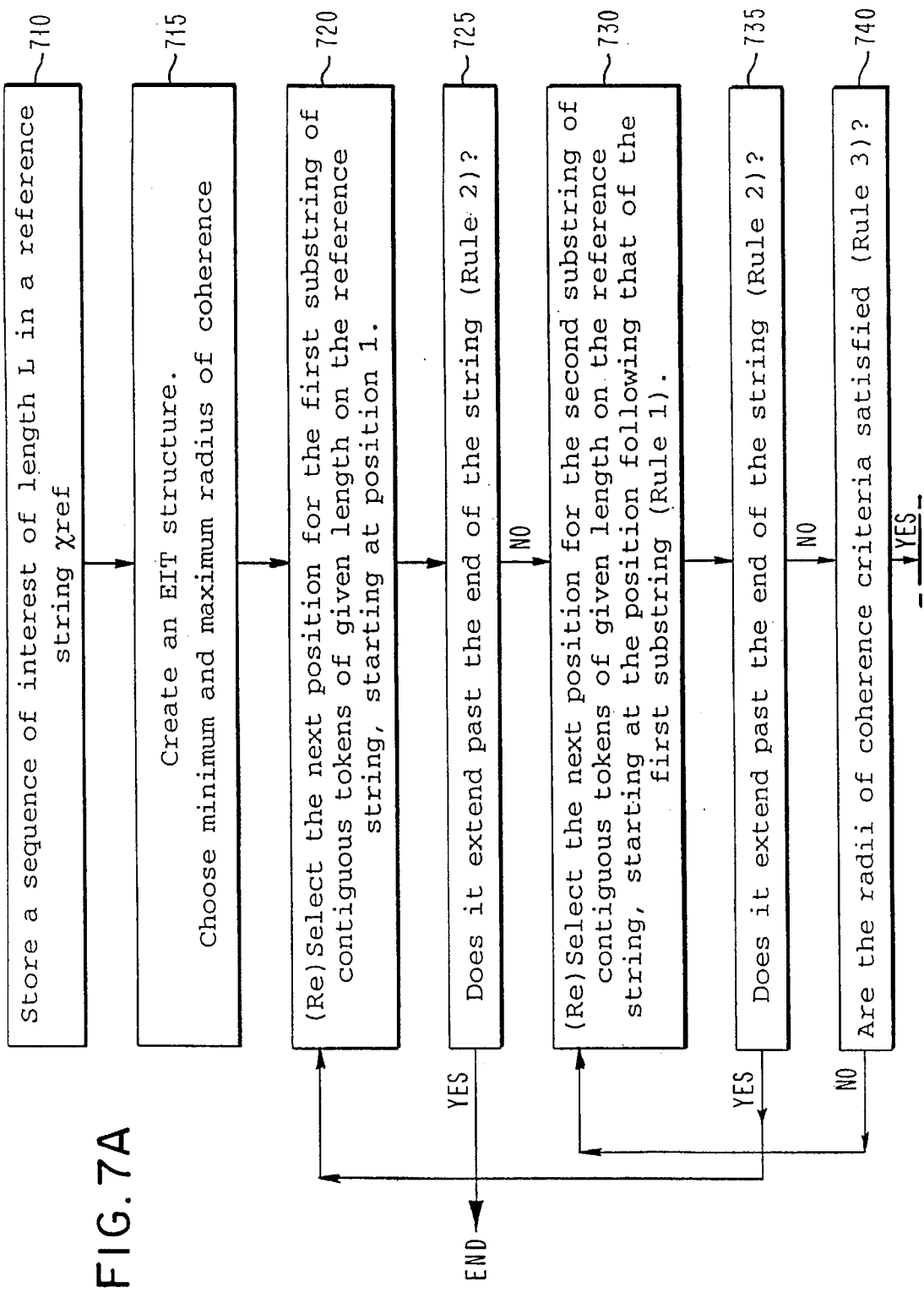
FIGS. 7A, 7B, and 7C, is a flow chart of the computer program which creates reference tuples and reference indexes, matches reference and original indexes, and updates the EIT.
Figure 7B:
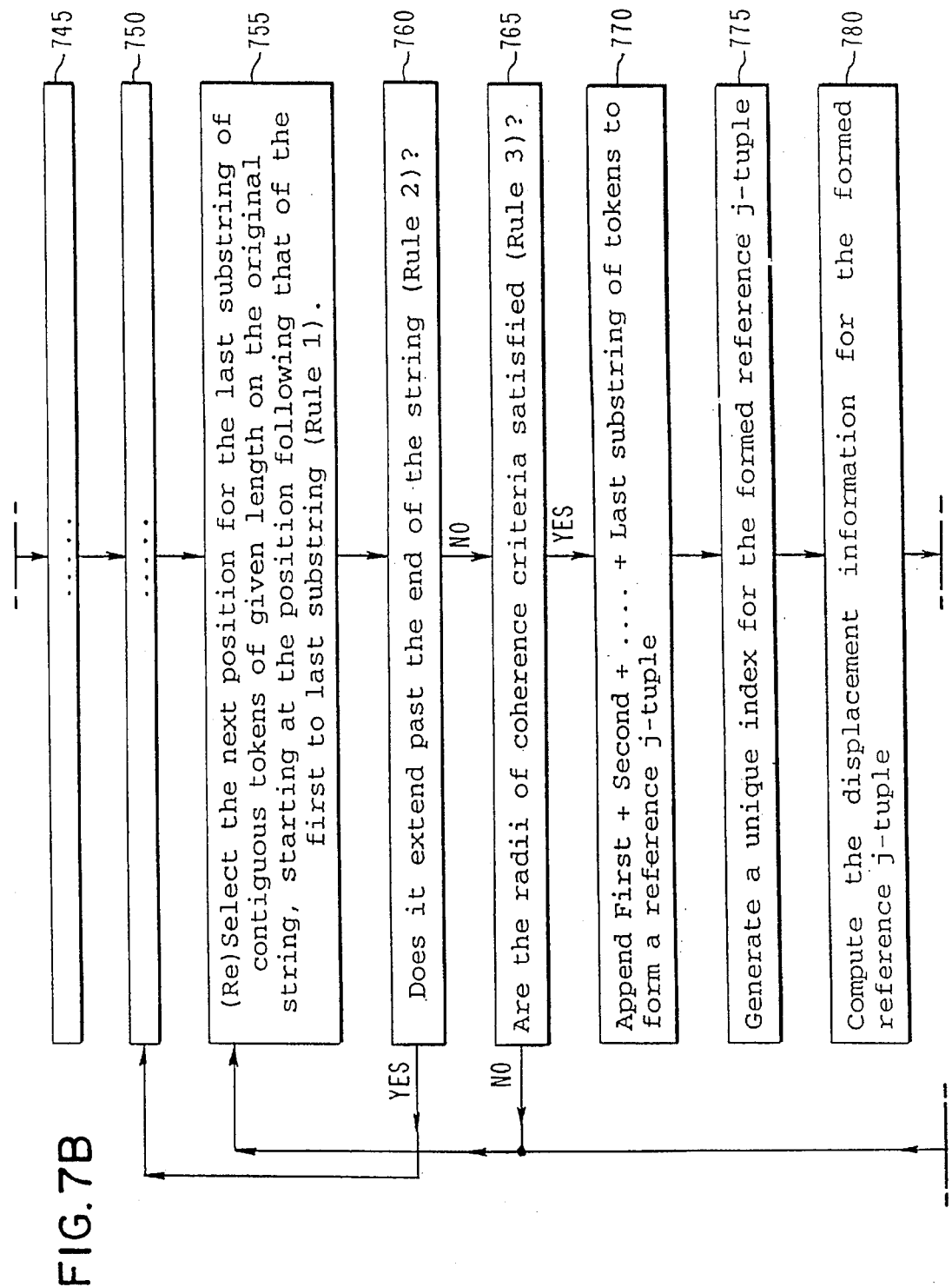
Figure 7C:
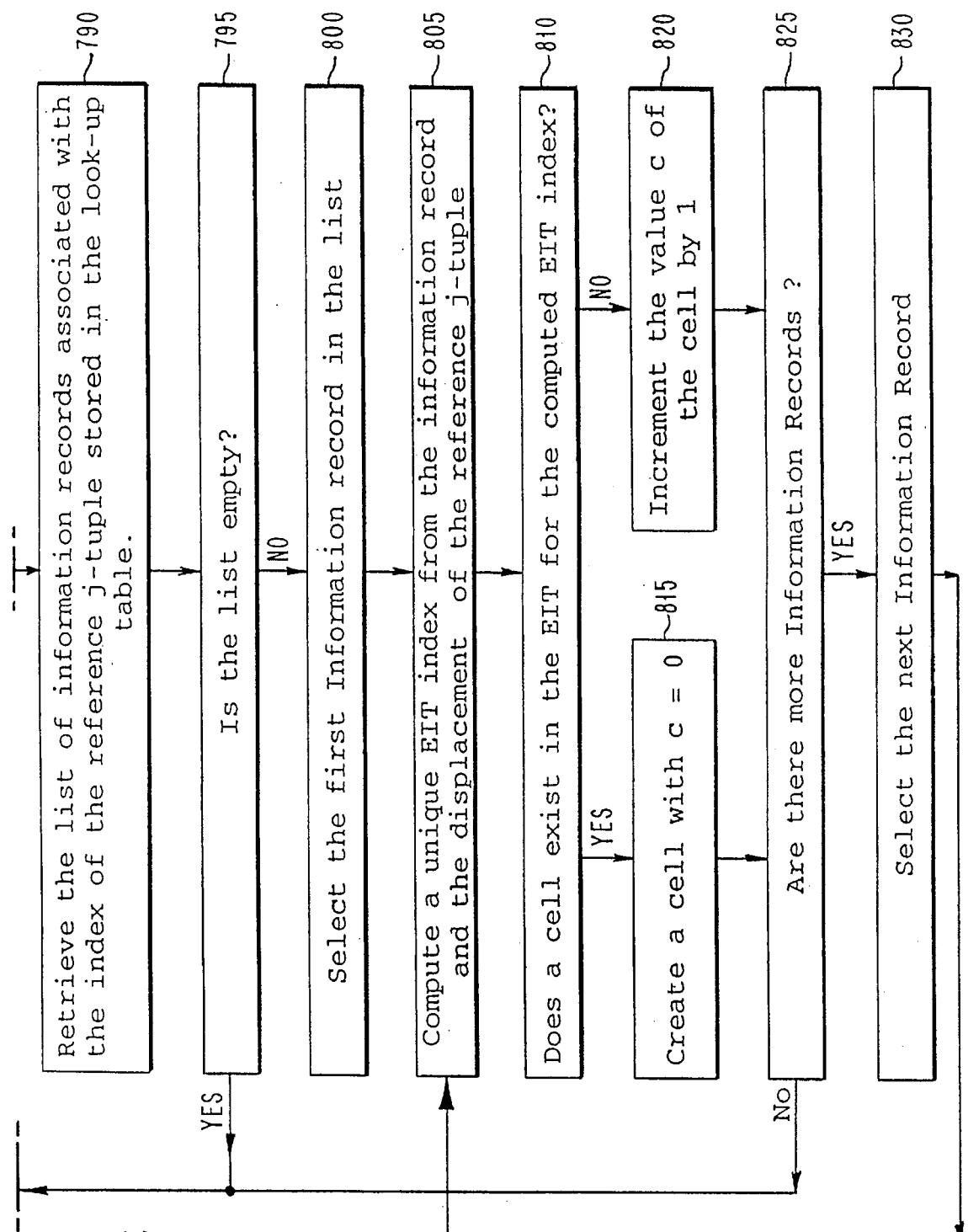

FIG. 6 and 7 are flow charts of the computer program which this invention uses to create and store original tuples (indexes) and later locate the original strings associated with these tuples (indexes) which match a reference string. FIG. 6 is a flow chart of the computer program which creates original tuples, original indexes and associated information records. FIG. 7 is a flow chart of the computer program which creates reference tuples and reference indexes, matches reference and original indexes, and updates the EIT.

Refer to FIG. 6. In box 610, one or more sequences of tokens of arbitrary length L are placed in a computer database, X, as original strings, χ. Each original string is assigned a reference value, α, which can be a pointer or an index to a pointer. See box 615. Minimum and maximum radii of coherence are also stored in memory at this point. Box 620 starts the outer loop of a series of nested loops which will create original tuples out of an original string, based on the rules above. The first entrance into box 620 for an original string causes the first token in the string to be selected. In box 625, rule 2 is applied to determine if the length of the substring starting at this point exceeds the length of the original string. If it does, the program ends for this original string. If not, the program proceeds to box 630 where the second substring starting position is chosen. This position starts one token further down from the beginning of the string than that of the previous starting token, in this case, position 2. Rule 1 is satisfied as long as subsequent strings start further down the original string the previous strings. This box starts the second level of nested loops. Box 635 applied rule 2 to the second chosen string. If the rule is violated, control passes back to box 620 or the outer nested loop. If the rule is satisfied, control stays within the second level of nested loops and the conditions of rule 3 are applied in box 640. If the rule 3 conditions fail, another starting position for the second substring (still within the second level of nested loops) is selected and the process repeats. The process is repeated in boxes 645 and 650 until the starting position for the last original substring is reached. Essentially, boxes 645 and 650 designate an arbitrary number of sub-loops which are used to generate every combination of j-tuples satisfying the rules for a given number, j, substrings in the j-tuple. Note that if we are using only two substrings, i.e., j=2, boxes 645 and 665 may be deleted. At the time when tuples are generated by starting with the last substring in the original string, the procedure enters box 655. If the selected string violates rule 2 in box 660, control is passed to the next outer loop, arrow 650. If the end of the string has been reached by all the loops, control keeps being passed to outer loops until it reached the outer most loop level of box 620 and then exits the program at box 625. For the j th substring, the conditions of rule 2 and 3 are checked and processed in boxes 660 and 665 in the same way as described above. As shown in box 670, all the j substrings selected in the loops, which satisfy the three rules, are appended together to form a tuple. The unique original index for the tuple formed in box 670 is created in box 675 using the methods described above. As described above, displacement information for the j-tuple is computed in box 680 and the information record is computed in box 685. In box 690, the list of information records associated with the created j-tuple is retrieved from the look-up table. If not already there, the new information record is appended to the list and the list is restored in the look-up table. Control is then returned to box 655 to generate the next tuple in this level of nested loop. The entire flow chart procedure of FIG. 6 is repeated for each original string in the database.

Refer to FIG. 7. Box 710 stores a reference string of interest in the database. Box 715 creates an EIT structure and chooses the minimum and maximum radii of coherence. Boxes 720 through 775 create reference tuples and reference indexes from the reference string in exactly the same manner as was done for original strings in FIG. 6 described above. Box 780 computes the reference displacement information, Δ, as described above. Box 790 uses the generated reference index to access an information record/list in a cell in the look-up structure which is indexed by a value equal to the generated reference index. Box 795 checks to see if the information record/list is empty. If it is, control is passed to box 755 which proceeds to generate the next reference index. If the cell contains an information record/list, the first information record in the list is selected in box 800. A voting (EIT) index is computed, as described above, in box 805. A cell in the EIT is then accessed using the voting index as described above in box 810. If no cell exists, a cell is created and a value of c=0 is placed in the cell, box 815. If a cell exists, the value of c in the cell is incremented by 1, box 820. The process is repeated by boxes 825 and 830 until all the information records in the list have "voted". When there are no further information records, control is passed back to box 755 in order to generate the next reference tuple.

Note that given this invention disclosure, there are many variations of this algorithm which can be developed and which are contemplated by the invention.

EXAMPLE 2

The most preferred embodiment of the present invention has specific application to searching the genome of living organisms, in particular the human genome, to find locations and purposes of nucleotide sequences and other biological information that are found on strings of DNA. Using this method, this information can be determined with greater speed and accuracy than ever possible before using prior art methods. A non limiting example is now given.

Although the entire human genome has not been decoded, there are databases commercially available which have substrings of the DNA chains broken down into nucleotide token sequences. This information is easily placed in a computer database and reference/pointer designations of the data may even be provided. Using algorithms like those discussed above, these DNA original strings are partitioned into contiguous substrings of nucleotides which obey the three rules described above. Using these contiguous substrings, a set of at least one original tuple is formed. At least one original tuple in this set is created by appending at least two non contiguous substrings of nucleotide tokens. Note that other contiguous substrings of nucleotide tokens can also be appended to this tuple. A unique original index associated with the original DNA string is then created (see example presented above). A reference nucleotide sequence is selected. The reference tuples of nucleotide tokens are created as explained above. Again, at least one reference tuple must be created by appending together at least two non contiguous reference substrings. A unique reference index is created using the same index generating algorithm that created the original indexes. See above example. The reference indexes and original indexes are compared, just as in the general method, by using the look-up table. The most preferred look-up table is an array. The matches, as before, are tracked using a second memory structure, EIT. The most preferred EIT is a dynamic hash table. The DNA original strings are selected using the values of c in the EIT that have a value above a given threshold.

The method has been successfully tested to match reference strings of nucleotides for the genome of E. Coli which contains approximately 4 million nucleotides.

This invention has many other applications, including but not limited to matching amino acid sequences on proteins, character string recognition, speech recognition, and music recognition.

EXAMPLE 3

The application of the method to matching amino acid token sequences to an original protein string of amino acid tokens is similar to the DNA example and to some degree is also described above. Original protein strings of amino acid tokens, either can be obtained commercially as databases or can manually be entered into computer memory. As stated before, the 20 possible amino acid tokens are assigned representative alphanumeric characters to uniquely identify them. These characters are given a unique numeric value and therefore strings of amino acid tokens can be converted into strings of numbers. Original and reference tuples and indexes are created and compared as before. As before, the number of matches is tracked in an EIT and the matching original strings are accessed by locating the voting cells with the values of c above a given threshold.

EXAMPLE 4

Character string recognition is accomplish in much the same way. Each character is assigned a unique numeric value. The strings of character tokens are converted into strings of numbers which are processed, using the general method, to created the original and reference tuples and indexes. The indexes are compared, matched, and tracked as before. Original character strings are accessed from the database by finding values of c in an EIT which are above a given threshold.

EXAMPLE 5

Speech recognition is accomplished in the same way. First the speech is converted to phonemes using techniques well known in the art. The speech patterns then become strings of phoneme tokens. Each phoneme token is assigned a unique numeric value and the original and reference phoneme strings of tokens is converted into a string of numbers. The general method is then applied as before.

EXAMPLE 6

Music recognition is also possible using the present invention. A song or musical score is a sequence of note tokens. Each note is assigned a numeric or alphanumeric value. For instance, the notes in the C scale are represented as "CDEFGABC". Flats and sharps, rests, and note duration (quarter and eighth notes, etc.) can be designated by using additional alphanumeric values. Other conversion techniques can be developed using known methods. The song or musical score than becomes a sequence of alphanumeric characters which using the disclosure above can be turned into sequence of numbers. The general method is then used to match a reference sequence of notes to original strings of notes in the data base.

We claim:

1. A method for finding a reference string of tokens in one or more original token strings within a database comprising the steps of:

creating one or more original tuples for each of the original token strings in the database by:
 a. partitioning each original token string into three or more original substrings of contiguous tokens;
 b. appending together two or more original substrings of the original token string to form one or more original tuples associated with the original token string, at least one of the original tuples being formed by appending together two or more non-contiguous original substrings of the original token string;

creating a unique original index for each original tuple created from the original token string by using an index algorithm, the original index being associated with the original token string from which the original tuple was created, each original index associated with information that is used to locate the original token string in the database containing the tuple from which the original index was derived and to determine the position of the matched reference sequence in the original token string;

creating one or more reference tuples from the reference string of tokens by:
 c. partitioning the reference string of tokens into three or more reference substrings of contiguous tokens;
 d. appending together two or more reference substrings to form one or more reference tuples, at least one of the reference tuples being formed by appending together two or more non-contiguous reference substrings;

creating a unique reference index for each reference tuple using the index algorithm;

comparing at least one reference index to at least one original index;

tracking the matches between the reference index and original index;

selecting an original token string in the database based on the number of matches between one or more original indexes and one or more reference indexes.

2. A method of finding a reference string of tokens in one or more original token strings with a database, as in claim 1, where the original substrings of tokens are all of a fixed length.

3. A method of finding a reference string of tokens in one or more original token strings within a database, as in claim 1, where the original substrings of tokens are of different lengths.

4. A method of finding a reference string of tokens in one or more original token strings within a database, as in claim 1, where the original tuples formed are of a fixed length.

5. A method of finding a reference string of tokens in one or more original token strings with a database, as in claim 1, where the original tuples formed are of a different lengths.

6. A method of finding a reference string of tokens in one or more original token strings within a database, as in claim 1, where the original tuples are formed by using the following rules:

each subsequent substring forming the original tuple has a starting position in tokens further away from a beginning token of the original token string than a prior starting position of all prior substrings forming the original tuple;

no substring can be used form a tuple if its starting position and length in tokens cause the tuple to exceed the length of the original token string;

The starting tokens of two subsequent substrings in an original string must be between a minimum and a maximum radius of coherence of one another, the radius distances being measured in tokens.

7. A method of finding a reference string of tokens in one or more original token strings within a database, as in claim 1, where the original index and the reference index are numbers.

8. A method of finding a reference string of tokens in one or more original token strings within a database, as in claim 1, where the original index and the reference index are integers.

9. A method for recognizing and accessing a reference string of tokens in one or more original token strings within a database comprising the steps of:

creating one or more original tuples for each of the original token strings in the database by:
  a. partitioning each original token string into three or more original substrings of contiguous tokens;
  b. appending together two or more original substrings of the original token string to form one or more original tuples associated with the original token string, at least one original tuple being formed by appending two or more non-contiguous original substrings of the original token string;

creating a unique original index for each original tuple created from the original token string by using an index algorithm, the original index being associated with the original token string from which the original tuple was created;

using the original index to point to a cell in a first memory look-up structure and storing in the cell an information record associated with the original string, the information record containing pointing information used to locate the original token string in the database containing the tuple from which the original index was derived and displacement information used to determine the position of the matched reference sequence in the original token string;

creating one or more reference tuples from the reference string of tokens by:
  c. partitioning the reference string of tokens into three or more reference substrings of contiguous tokens;
  d. appending together two or more reference substrings to form one or more reference tuples, at least one on the reference tuples being formed by appending together two or more non-contiguous reference substrings;

creating a unique reference index for each reference tuple using the index algorithm comparing at least one reference index to at least one original index using the memory look-up structure;

tracking the matches between the reference index and original index;

storing the tracking results in a second memory look-up structure;

selecting an original token string in the database based on the number of matches between one or more original indexes and one or more reference indexes.

10. A method for recognizing and accessing a reference string of tokens in one or more original token strings within a database, as in claim 9, where the cell contains a list of information records where the information records contains a reference to an original token string.

11. A method for recognizing and accessing a reference string of tokens in one or more original token strings within a database, as in claim 9, where the cell contains a list of information records which include a reference to an original token string and associated displacement information.

12. A method for recognizing and accessing a reference string of tokens in one or more original token strings within a database, as in claim 9, where the displacement information is computed based on a position in tokens of at least one substring of the original token string used to form the tuple of the original index.

13. A method for recognizing and accessing a reference string of tokens in one or more original token strings within a database, as in claim 9, where the displacement information is a distance in tokens between an average of the position of each original substring used to form the tuple and a given token on the original token string.

14. A method for recognizing and accessing a reference string of tokens in one or more original token strings within a database, as in claim 9, where the match between the original token string and the reference string is an exact match.

15. A method for recognizing and accessing a reference string of tokens in one or more original token strings within a database, as in claim 9, where the match between the original token string and the reference string is a similar match.

16. A method for recognizing and accessing a reference string of tokens in one or more original token strings within a database, as in claim 9, where information in the second memory structure includes a value which indicates the degree of similarity between the original token string and the reference string.

17. A method for recognizing and accessing a reference string of tokens in one or more original token strings within a database, as in claim 9, where the first look-up structure is a data structure that includes structures like a vector, array, and hash table.

18. A method for recognizing and accessing a reference string of tokens in one or more original token strings within a database, as in claim 17, where the first look-up structure is an array.

19. A method for recognizing and accessing a reference string of tokens in one or more original token strings within a database, as in claim 9, where the second look-up structure is a static data structure that includes structures like a vector, array, and hash table.

20. A method for recognizing and accessing a reference string of tokens in one or more original token strings within a database, as in claim 9, where the second look-up structure is a dynamic data structure that includes structures like a vector, array, and hash table.

21. A method for recognizing and accessing a reference string of tokens in one or more original token strings within a database, as in claim 20, where the second look-up structure is a dynamic hash table.

22. A method for recognizing and accessing a reference string of tokens in one or more original token strings within a database, as in claim 9, where the second memory look-up structure is updated every time a reference index matches a original index.

23. A method for recognizing and accessing a reference string of nucleotides in one or more original DNA strings within a database comprising the steps of:

creating one or more original tuples for each of the original DNA strings in the database by:
  a. partitioning each original DNA string into three or more substrings of contiguous nucleotides;
  b. appending together two or more original DNA substrings of the original DNA string to form one or more original tuples associated with each original DNA string;

creating a unique original index for each original tuple created from the original DNA string using an index algorithm, the original index being associated with the original DNA string from which the original tuple was created;

creating one or more reference tuples from the reference string of tokens by:
  c. partitioning the reference string of nucleotides into three or more reference substrings of contiguous nucleotides;

d. appending together two or more reference substrings to form one or more reference tuples, at least one of the reference tuples being formed by appending together two or more non-contiguous reference substrings;

creating a unique reference index for each reference tuple using the index algorithm;

comparing at least one reference index to at least one original index to determine if the indexes match;

tracking the matches between the reference index and original index;

selecting an original DNA string in the database based on the number of matches between one or more original indexes and one or more reference indexes.

24. A method for recognizing and accessing a reference string of amino acids in one or more original protein strings within a database comprising the steps of:

creating one or more original tuples for each of the original protein strings in the database by:
  a. partitioning each original protein string into three or more substrings of contiguous amino acids;
  b. forming one or more original tuples associated with each original protein string by appending together two or more original amino acid substrings of the original string, one or more of the original tuples being formed by appending together at least two non contiguous original amino acid substrings;

creating a unique original index for each original tuple created from the original protein string using an index algorithm, the original index being associated with the original protein string from which the original tuple was created;

creating one or more reference tuples from the reference string of tokens by:
  c. partitioning the reference string of amino acids into three or more contiguous reference substrings of amino acids;
  d. forming two or more reference tuples by appending together two or more reference substrings, one or more of the reference tuples being formed by appending two or more non contiguous reference substrings;

creating a unique reference index for each reference tuple using the index algorithm;

comparing at least one reference index to at least one original index;

tracking the matches between the reference index and original index;

selecting an original protein string in the database based on the number of matches between one or more original indexes and one or more reference indexes.

25. A method for recognizing and accessing a reference string of characters in one or more original character strings within a database comprising the steps of:

creating one or more original tuples for each of the original character strings in the database by:
  a. partitioning each original character string into three or more substrings of contiguous characters;
  b. forming one or more original tuples associated with each original character string by appending together two or more original character substrings of the original string, one or more of the original tuples being formed by appending together two or more non contiguous original character substrings;

creating a unique original index for each original tuple created from the original character string using an index algorithm, the original index being associated with the original character string from which the original tuple was created;

creating one or more reference tuples from the reference string of tokens by:
  c. partitioning the reference string of characters into three or more non contiguous reference substrings of characters;
  d. forming two or more reference tuples by appending together two or more reference substrings, one or more of the reference tuples being formed by appending two or more non contiguous reference substrings;

creating a unique reference index for each reference tuple using the index algorithm;

comparing at least one reference index to at least one original index;

tracking the matches between the reference index and original index;

selecting an original character string in the database based on the number of matches between one or more original indexes and one or more reference indexes.

26. A method for recognizing and accessing a reference string of phonemes in one or more original phoneme strings within a database comprising the steps of:

creating one or more original tuples for each of the original phoneme strings in the database by:
  a. partitioning each original phoneme string into three or more original substrings of contiguous phonemes;
  b. forming one or more original tuples associated with each original phoneme string by appending together two or more original substrings of the original string, one or more of the original tuples being formed by appending together at least two non contiguous original substrings;

creating a unique original index for each original tuple created from an original phoneme string using an index algorithm, the original index being associated with the original phoneme string from which the original tuple was created;

creating one or more reference tuples from the reference string of phonemes by:
  c. partitioning the reference string of phoneme into three or more contiguous reference substrings of phonemes;
  forming two or more reference tuples by appending together two or more reference substrings, one or more of the reference tuples being formed by appending two or more non contiguous reference substrings;

creating a unique reference index for each reference tuple using the index algorithm;

comparing at least one reference index to at least one original index;

tracking the matches between the reference index and original index;

selecting an original phoneme string in the database based on the number of matches between one or more original indexes and one or more reference indexes.

27. A method for recognizing and accessing a reference string of notes in one or more original note strings within a database comprising the steps of:

creating one or more original tuples for each of the original note strings in the database by:
  a. partitioning each original note string into three or more original substrings of contiguous notes;

b. forming one or more original tuples associated with each original note string by appending together two or more original substrings of the original string, one or more of the original tuples being formed by appending together at least two non contiguous original substrings;

creating a unique original index for each original tuple created from the original note string using an index algorithm, the original index being associated with the original note string from which the original tuple was created;

creating one or more reference tuples from the reference string of note by:
 c. partitioning the reference string of notes into three or more contiguous reference substrings of notes;
 d. forming two or more reference tuples by appending together two or more reference substrings, one or more of the reference tuples being formed by appending two or more non contiguous reference substrings;

creating a unique reference index for each reference tuple using the index algorithm;

comparing at least one reference index to at least one original index;

tracking the matches between the reference index and original index;

selecting an original note string in the database based on the number of matches between one or more original indexes and one or more reference indexes.

28. A computer system for recognizing and accessing a reference string of tokens in one or more original token strings within a database comprising:

a database having a set of original token strings;

a means for creating at least one original tuple for each of the original token strings in the database, the tuple formed by:

a. partitioning each original token string into three or more contiguous original substrings of tokens;
 b. forming one or more original tuple associated with each original string by appending together two or more original substrings of the original string, one or more of the original tuples being formed by appending together at least two non contiguous original substrings;

a unique original index for each original tuple created from the original string using an index algorithm, the original index being associated with the original string from which the original tuple was created;

a first memory look-up structure with cells, the cells being accessed by the original index and containing information associated with the original string from which the original tuple was created;

one or more reference tuples created from the reference string of tokens by:
 c. partitioning the reference string of tokens into three or more non contiguous reference substrings of tokens;
 d. forming the reference tuples by appending together at least two reference substrings, one or more of the reference tuples being formed by appending two or more non contiguous reference substrings;

unique reference index for each reference tuple created using the index algorithm, the reference index compared to at least one reference index to at least one original index;

a second memory look-up structure for tracking matches between the reference index and original index, an original token string in the database being selected based on the number of matches between one or more original indexes and one or more reference indexes.

* * * * *